(12) United States Patent
Hu

(10) Patent No.: US 9,870,082 B2
(45) Date of Patent: Jan. 16, 2018

(54) PIXEL DRIVER CIRCUIT, PIXEL DRIVING METHOD, PIXEL CIRCUIT AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventor: Zuquan Hu, Beijing (CN)

(73) Assignees: BOE TECHNOLOGY GROUP CO., LTD. (CN); HEFEI XINSHENG OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 15/309,269

(22) PCT Filed: Feb. 2, 2016

(86) PCT No.: PCT/CN2016/073134
§ 371 (c)(1),
(2) Date: Nov. 7, 2016

(87) PCT Pub. No.: WO2017/049831
PCT Pub. Date: Mar. 30, 2017

(65) Prior Publication Data
US 2017/0269747 A1 Sep. 21, 2017

(30) Foreign Application Priority Data
Sep. 21, 2015 (CN) .......................... 2015 1 0604638

(51) Int. Cl.
*G09G 3/32* (2016.01)
*G06F 3/041* (2006.01)
*G09G 3/3225* (2016.01)

(52) U.S. Cl.
CPC .......... *G06F 3/0412* (2013.01); *G06F 3/0416* (2013.01); *G09G 3/3225* (2013.01);
(Continued)

(58) Field of Classification Search
CPC .. G06F 3/0416; G09G 3/3208; G09G 3/3225; G09G 3/3233; G09G 2300/0426; G09G 2300/0861; H01L 27/32
See application file for complete search history.

(56) References Cited

U.S. PATENT DOCUMENTS 7,502,001 B2 * 3/2009 Fish ...................... G09G 3/3233
345/207
8,242,983 B2 * 8/2012 Yoo ....................... G09G 3/3233
315/169.3

(Continued)

FOREIGN PATENT DOCUMENTS

CN 103325343 A 9/2013
CN 103354078 A 10/2013
(Continued)

OTHER PUBLICATIONS

First Office Action for Chinese Application No. 201510604638.0, dated Mar. 1, 2017, 7 Pages.
(Continued)

*Primary Examiner* — Joe H Cheng
(74) *Attorney, Agent, or Firm* — Brooks Kushman P.C.

(57) ABSTRACT

The present disclosure provides a pixel driver circuit, a pixel driving method, a pixel circuit and a display device. The pixel driver circuit includes a touch element connection unit connected between a touch element and a second end of a storage capacitor, a diving control unit connected between a gate electrode of a driving transistor and the second end of the storage capacitor, a first power voltage application unit connected between a second electrode of the driving tran- (Continued)

sistor and a first power line, a touch detection unit connected between a touch detection line and a first electrode of the driving transistor, and a threshold compensation control unit configured to receive a reference voltage and connected to the gate electrode of the driving transistor and the second end of the storage capacitor.

18 Claims, 4 Drawing Sheets

(52) U.S. Cl.
CPC ............ *G09G 2300/0408* (2013.01); *G09G 2300/0426* (2013.01); *G09G 2300/0876* (2013.01); *G09G 2354/00* (2013.01); *G09G 2370/22* (2013.01)

(56) References Cited

U.S. PATENT DOCUMENTS

| | | | | |
|---|---|---|---|---|
| 8,907,870 B2* | 12/2014 | Kang | ............... | G09G 3/3233 345/76 |
| 9,459,721 B2* | 10/2016 | Tan | ............... | G06F 3/0412 |
| 2005/0099372 A1 | 5/2005 | Nakamura et al. | | |
| 2006/0023551 A1* | 2/2006 | Peng | ............... | G09G 3/3233 365/226 |
| 2006/0103324 A1* | 5/2006 | Kim | ............... | G09G 3/3233 315/169.3 |
| 2006/0145967 A1* | 7/2006 | Huh | ............... | G09G 3/325 345/76 |
| 2009/0027310 A1* | 1/2009 | Kim | ............... | G09G 3/3233 345/76 |
| 2010/0164847 A1* | 7/2010 | Lee | ............... | G09G 3/3233 345/77 |
| 2011/0001711 A1* | 1/2011 | Choi | ............... | G06F 3/042 345/173 |
| 2011/0115764 A1* | 5/2011 | Chung | ............... | G09G 3/3233 345/205 |
| 2011/0122111 A1* | 5/2011 | Brown | ............... | G06F 3/0412 345/207 |
| 2013/0088165 A1* | 4/2013 | Wang | ............... | G09G 3/3233 315/240 |
| 2013/0106828 A1* | 5/2013 | Kim | ............... | G09G 3/3233 345/212 |
| 2014/0118231 A1* | 5/2014 | Yang | ............... | G09G 3/3258 345/82 |
| 2014/0168127 A1* | 6/2014 | Yang | ............... | G06F 3/0412 345/173 |
| 2014/0313138 A1 | 10/2014 | Jeong et al. | | |
| 2015/0103037 A1* | 4/2015 | Wu | ............... | G09G 3/3233 345/174 |
| 2015/0220201 A1 | 8/2015 | Wu et al. | | |
| 2015/0301674 A1* | 10/2015 | Tan | ............... | G06F 3/042 345/173 |
| 2015/0302801 A1 | 10/2015 | Tan et al. | | |
| 2016/0041676 A1* | 2/2016 | Tan | ............... | G06F 3/0416 345/173 |
| 2016/0266688 A1* | 9/2016 | Yang | ............... | G06F 3/041 |
| 2017/0162121 A1* | 6/2017 | Yang | ............... | G09G 3/3266 |

FOREIGN PATENT DOCUMENTS

| | | |
|---|---|---|
| CN | 104269142 A | 1/2015 |
| CN | 104392699 A | 3/2015 |
| CN | 105118438 A | 12/2015 |
| CN | 205122154 U | 3/2016 |

OTHER PUBLICATIONS

International Search Report and Written Opinion for Application No. PCT/CN2016/073134, dated Jun. 16, 2016, 14 Pages.

* cited by examiner

PIXEL DRIVER CIRCUIT, PIXEL DRIVING METHOD, PIXEL CIRCUIT AND DISPLAY DEVICE

CROSS-REFERENCE TO RELATED APPLICATIONS

This application is the U.S. national phase of PCT Application No. PCT/CN2016/073134 filed on Feb. 2, 2016, which claims priority to Chinese Patent Application No. 201510604638.0 filed on Sep. 21, 2015, the disclosures of which are incorporated in their entirety by reference herein.

TECHNICAL FIELD

The present disclosure relates to the field of display technology, in particular to a pixel driver circuit, a pixel driving method, a pixel circuit and a display device.

BACKGROUND

Along with the development of the display technology, an Active Matrix Organic Light-Emitting Diode (AMOLED) display panel has been widely applied in the market. As a new research direction, it is required to integrate a touch function into the AMOLED display panel, especially along with the mass production of the AMOLED display panel. For example, in the case that an in-cell touch sensor is integrated into the AMOLED display panel, it is able to provide a thin and light product, and provide the AMOLED display panel with various functions, especially the touch function. However, in the related art, it is impossible to integrate an in-cell touch sensor circuit into an AMOLED pixel circuit, to provide the AMOLED display panel with both the touch function and a display function, and simplify the entire circuit.

SUMMARY

A main object of the present disclosure is to provide a pixel driver circuit, a pixel driving method, a pixel circuit and a display device, to achieve both the touch function and the display function through an identical circuit, and reduce the number of thin film transistors (TFTs) and capacitors used in the circuit.

In one aspect, the present disclosure provides in some embodiments a pixel driver circuit, including a driving transistor and a storage capacitor. A first electrode of the driving transistor is connected to a light-emitting element, and a first end of the storage capacitor is connected to the first electrode of the driving transistor. The pixel driver circuit further includes: a touch element connection unit connected between a touch element and a second end of the storage capacitor; a diving control unit connected between a gate electrode of the driving transistor and the second end of the storage capacitor; a first power voltage application unit connected between a second electrode of the driving transistor and a first power line; a touch detection unit connected between a touch detection line and the first electrode of the driving transistor; and a threshold compensation control unit configured to receive a reference voltage and connected to the gate electrode of the driving transistor and the second end of the storage capacitor.

Optionally, the touch element connection unit includes a first transistor, a gate electrode of which is configured to receive a first control signal, a first electrode of which is connected to the touch element, and a second electrode of which is connected to the second end of the storage capacitor.

Optionally, the driving control unit includes a second transistor, a gate electrode of which is configured to receive a second control signal, a first electrode of which is connected to the second end of the storage capacitor, and a second electrode of which is connected to the gate electrode of the driving transistor.

Optionally, the touch detection unit includes a third transistor, a gate electrode of which is configured to receive a third control signal, a first electrode of which is connected to the first end of the storage capacitor, and a second electrode of which is connected to the touch detection line.

Optionally, the first power voltage application unit includes a fourth transistor, a gate electrode of which is configured to receive a fourth control signal, a first electrode of which is connected to the second electrode of the driving transistor, and a second electrode of which is configured to receive a first power voltage.

Optionally, the threshold compensation control unit includes: a fifth transistor, a gate electrode of which is configured to receive a scanning voltage signal, a first electrode of which is connected to the gate electrode of the driving transistor, and a second electrode of which is configured to receive the reference voltage; and a sixth transistor, a gate electrode of which is configured to receive the scanning voltage signal, a first electrode of which is connected to the second end of the storage capacitor, and a second electrode of which is connected to a data line.

In another aspect, the present disclosure provides in some embodiments a pixel driving method using the above-mentioned pixel driver circuit, including: a touch sensing step of, within a touch sensing time period of a touch stage, enabling the second end of the storage capacitor to receive a touch sensing voltage from the touch element under the control of the touch element connection unit, and enabling the driving control unit to write the touch sensing voltage into the gate electrode of the driving transistor; a touch detecting step of, within a touch detecting time period of the touch stage, enabling the second electrode of the driving transistor to receive a first power voltage under the control of the first power voltage application unit, and enabling the first electrode of the driving transistor to be electrically connected to the touch detection line under the control of the touch detection unit, to enable the driving transistor to output a corresponding touch sensing current to the touch detection line in accordance with the touch sensing voltage written into the gate electrode of the driving transistor; a threshold compensation step of, within a threshold compensation time period of a display stage, enabling the gate electrode of the driving transistor to receive a reference voltage Vref and enabling the second end of the storage capacitor to receive a data voltage Vdata under the control of the threshold compensation control unit, and enabling the second electrode of the driving transistor to receive the first power voltage under the control of the first power voltage application unit, to enable the driving transistor to be in an on state, thereby to charge the storage capacitor until the first end of the storage capacitor is at a potential of Vref−Vth, Vth being a threshold voltage of the driving transistor; and a display driving step of, within a display driving time period of the display stage, enabling the gate electrode of the driving transistor to be electrically connected to the second end of the storage capacitor under the control of the driving control unit, and enabling the second electrode of the driving transistor to receive the first power voltage under the control of the first power voltage application unit, to enable the driving transistor to be in the on state, thereby to drive the light-emitting element to emit light.

Optionally, subsequent to the touch detection step and prior to the threshold compensation step, the method further includes a display initialization step of, within a display initialization time period, enabling the gate electrode of the driving transistor to receive the reference voltage and enabling the second end of the storage capacitor to receive the data voltage under the control of the threshold compensation control unit, and enabling the first electrode of the driving transistor to receive a display initialization voltage from the touch detection line under the touch control of the touch detection unit, to enable the driving transistor to be in the on state.

Optionally, prior to the touch sensing step, the method further includes a touch initialization step of, within a touch initialization time period, enabling the gate electrode of the driving transistor and the second end of the storage capacitor to receive the reference voltage under the control of the threshold compensation control unit, and enabling the first end of the storage capacitor to receive a touch initialization voltage from the touch detection line under the control of the touch detection unit.

In yet another aspect, the present disclosure provides in some embodiments a pixel driving method using the above-mentioned pixel driver circuit, including: a touch sensing step of, within a touch sensing time period of a touch stage, enabling the first transistor to be in an on state to enable the second end of the storage capacitor to receive a touch sensing voltage from the touch element, enabling the second transistor to be in the on state to write the touch sensing voltage into the gate electrode of the driving transistor, and enabling the light-emitting element to be in a reverse connection state through controlling a value of a second power voltage, to enable the light-emitting element not to emit light; a touch detection step of, within a touch detection time period of the touch stage, enabling the first transistor to be in an off state, maintaining the second transistor to be in the on state, enabling the third transistor to be in the on state, enabling the fourth transistor to be in the on state, enabling the second electrode of the driving transistor to receive the first power voltage and enabling the first electrode of the driving transistor to be electrically connected to the touch detection line to enable the driving transistor to be in the on stat and output a sensing current corresponding to the touch sensing voltage to the touch detection line, and enabling the light-emitting element to be in a reverse connection state through controlling the value of the second power voltage, to enable the light-emitting element not to emit light; a threshold compensation step of, within a threshold compensation time period of a display stage, maintaining the fourth transistor to be in the on state, enabling the fifth transistor and the sixth transistor to be in the on state, to enable the gate electrode of the driving transistor to receive a reference voltage Vref, enable the second electrode of the driving transistor to receive the first power voltage and enable the second end of the storage capacitor to receive a data voltage Vdata, thereby to enable the driving transistor to be in the on state and charge the storage capacitor until the first electrode of the driving transistor is at a potential of Vref−Vth, and enabling the light-emitting element to be in the reverse connection state through controlling the value of the second power voltage, to enable the light-emitting element not to emit light, Vth being a threshold voltage of the driving transistor; and a display driving step of, within a display driving time period of the display stage, maintaining the fourth transistor to be in the on state, enabling the second transistor to be in the on state, to enable the gate electrode of the driving transistor to be electrically connected to the second end of the storage capacitor and enable the first electrode of the driving transistor to be electrically connected to the light-emitting element, thereby to enable the second electrode of the driving transistor to receive the first power voltage and enable the driving transistor to be in the on state, and enabling the light-emitting element to be in a normal connection state through controlling the value of the second power voltage, to enable the driving transistor to drive the light-emitting element to emit light.

Optionally, subsequent to the touch detection step and the prior to the threshold compensation step, the method further includes a display initialization step of, within a display initialization time period, enabling the third transistor, the fifth transistor and the sixth transistor to be in the on state, to enable the gate electrode of the driving transistor to receive the reference voltage, enable the first electrode of the driving transistor to receive a display initialization voltage, and enable the second end of the storage capacitor to receive the data voltage, thereby to enable the driving transistor to be in the on state.

Optionally, prior to the touch sensing step, the method further includes a touch initialization step of, within a touch initialization time period, enabling the second transistor, the third transistor, the fifth transistor and the sixth transistor to be in the on state, and enabling a data line to receive the reference voltage, to enable the gate electrode of the driving transistor and the second end of the storage capacitor to receive the reference voltage, and enable the first end of the storage capacitor to receive a touch initialization voltage from the touch detection line.

In still yet another aspect, the present disclosure provides in some embodiments a pixel circuit including a light-emitting element, a touch element and the above-mentioned pixel driver circuit. The pixel driver circuit is configured to sense whether or not the touch element is being touched and drive the light-emitting element to emit light.

Optionally, the light-emitting element includes an OLED, an anode of which is connected to the pixel driver circuit, and an anode of which is configured to receive a second power voltage.

Optionally, the touch element includes a variable capacitor or a photosensitive diode.

In still yet another aspect, the present disclosure provides in some embodiments a display device including the above-mentioned pixel circuit.

According to the pixel driver circuit, the pixel driving method, the pixel circuit and the display device in the embodiments of the present disclosure, it is able to achieve a touch function and a display function, integrate the touch function into the pixel driver circuit, and reduce the number of the TFTs and capacitors used by the pixel driver circuit.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The present disclosure provides in some embodiments a pixel driver circuit including a driving transistor and a storage capacitor. A first electrode of the driving transistor is connected to a light-emitting element, and a first end of the storage capacitor is connected to the first electrode of the driving transistor. The pixel driver circuit further includes: a touch element connection unit connected between a touch element and a second end of the storage capacitor; a diving control unit connected between a gate electrode of the driving transistor and the second end of the storage capacitor; a first power voltage application unit connected between a second electrode of the driving transistor and a first power line; a touch detection unit connected between a touch detection line and the first electrode of the driving transistor; and a threshold compensation control unit configured to receive a reference voltage and connected to the gate electrode of the driving transistor and the second end of the storage capacitor.

According to the pixel driver circuit in the embodiments of the present disclosure, it is able to achieve a touch function and a display function, integrate the touch function into the gate driver circuit, and reduce the number of the TFTs and capacitors used in the pixel driver circuit.

Figure 1:
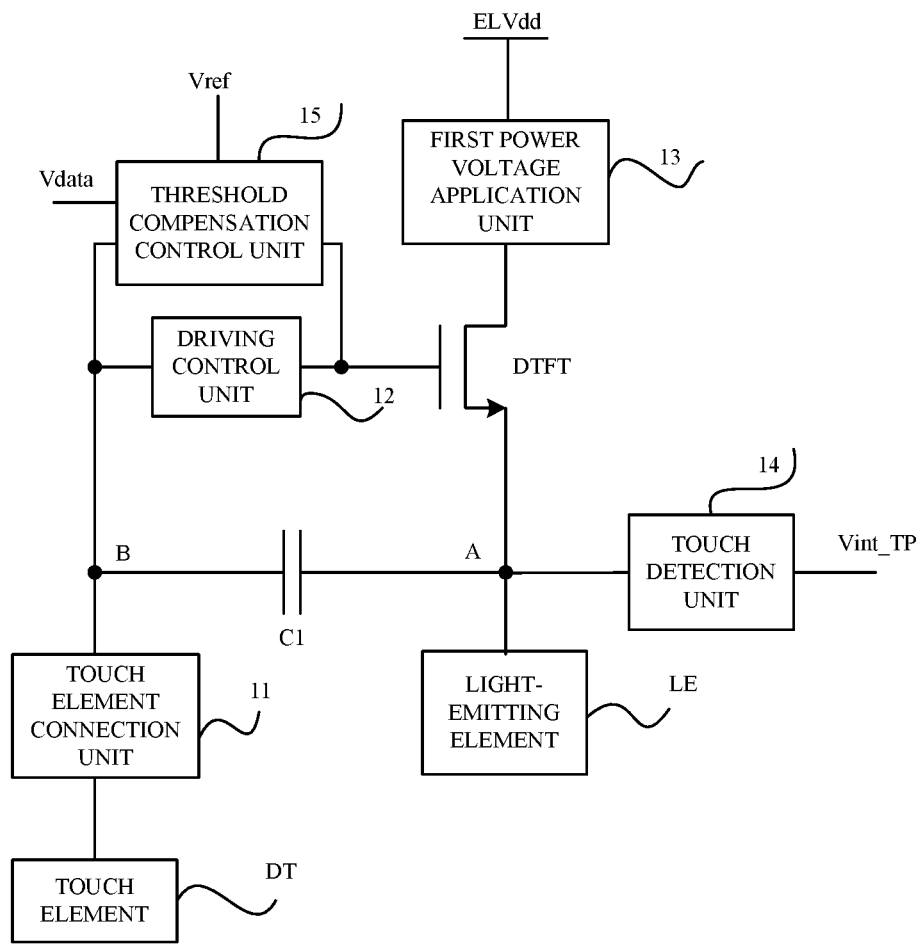
FIG. 1 is a schematic view showing a pixel driver circuit according to one embodiment of the present disclosure.

As shown in FIG. 1, the pixel driver circuit includes a driving transistor DTFT and a storage capacitor C1. A first electrode of the driving transistor DTFT is connected to a light-emitting element LE, and a first end A of the storage capacitor C1 is connected to the first electrode of the driving transistor DTFT. The pixel driver circuit further includes: a touch element connection unit 11 connected between a touch element DT and a second end B of the storage capacitor C1; a diving control unit 12 connected between a gate electrode of the driving transistor DTFT and the second end B of the storage capacitor C1; a first power voltage application unit 13 connected between a second electrode of the driving transistor DTFT and a first power line ELVdd; a touch detection unit 14 connected between a touch detection line Vint_TP and the first electrode of the driving transistor DTFT; and a threshold compensation control unit 15 configured to receive a reference voltage Vref and connected to the gate electrode of the driving transistor DTFT and the second end of the storage capacitor C1.

According to the pixel driver circuit in the embodiments of the present disclosure, it is able to achieve a touch function and a display function, integrate the touch function into the gate driver circuit, and reduce the number of the TFTs and capacitors used in the pixel driver circuit.

During the actual operation, the light-emitting element LE may be an OLED or any other light-emitting device.

In the embodiments of the present disclosure, the DTFT may be an n-type transistor, and in some other embodiments of the present disclosure, it may also be a p-type transistor.

During the operation of the pixel driver circuit, whether or not the touch element DT is being touched may be sensed at a touch stage, and the OLED may be driven to emit light at a display stage. The touch stage includes a touch sensing time period and a touch detection time period, and the display stage includes a threshold compensation time period and a display driving time period.

Within the touch sensing time period of the touch stage, the touch element DT is electrically connected to the second end B of the storage capacitor C1 under the control of the touch element connection unit 11, to enable the second end B of the storage capacitor to receive a touch sensing voltage from the touch element DT. The gate electrode of the driving transistor DTFT is electrically connected to the second end B of the storage capacitor C1 under the control of the driving control unit 12, to enable the gate electrode of the driving transistor DTFT to receive the touch sensing voltage.

Within the touch detection time period, the second electrode of the driving transistor DTFT is electrically connected to the first power line ELVdd under the control of the first power voltage application unit 13, and the touch detection line Vint_TP is electrically connected to the first electrode of the driving transistor DTFT under the control of the touch detection unit 14, to control the driving transistor to output a corresponding touch sensing current to the touch detection line in accordance with the touch sensing voltage written into the gate electrode of the driving transistor. At this time, the touch detection line functions as to receive the touch sensing current.

At the entire touch stage, the OLED is controlled to be in a reverse connection state, so it may not emit light.

Within the threshold compensation time period of the display stage, the gate electrode of the driving transistor DTFT is configured to receive the reference voltage Vref and the second end of the storage capacitor C1 is configured to receive the data voltage Vdata under the control of the threshold compensation control unit 15. The second electrode of the driving transistor is electrically connected to the first power line ELVdd under the control of the first power voltage application unit 13. At this time, the driving transistor DTFT is in an on state, to charge the storage capacitor C1 until VA=Vref−Vth. A voltage across the two ends of the storage capacitor C1 VB−VA=Vdata−(Vref−Vth)=Vdata−Vref+Vth. In addition, the OLED is controlled to be in the reverse connection state continuously, so it may not emit light. VA represents a voltage at the first end of the storage capacitor C1, VB represents a voltage at the second end of the storage capacitor C1, and Vth represents a threshold voltage of the driving transistor DTFT.

With the display driving time period of the display stage, the second electrode of the driving transistor DTFT is electrically connected to the first power line ELVdd under the control of the first power voltage application unit 13, and the gate electrode of the driving transistor DTFT is electrically connected to the second end B of the storage capacitor C1 under the control of the driving control unit 12. Hence, a gate-to-source voltage of the driving transistor DTFT Vgs=VB−VA. At this time, the driving transistor DTFT is in the on state, to drive the OLED to emit light. In addition, a value obtained by subtracting the threshold voltage Vth from the gate-to-source voltage Vgs of the driving transistor DTFT is less than or equal to a drain-to-source voltage Vds of the driving transistor DTFT, i.e., Vgs−Vth≤Vds, so the driving transistor DTFT is in a saturation state. At this time, for an on-state current I of the driving transistor DTFT, I=K(Vgs−Vth)$^2$=K(Vdata−Vref+Vth−Vth)$^2$=K(Vdata−Vref), where K is a constant related to a process parameter and a geometric dimension of the driving transistor DTFT. It is found that, the on-state current of the driving transistor DTFT is irrelevant to its threshold voltage. As a result, it is able to eliminate the influence of the threshold voltage of the driving transistor DTFT on the brightness of the OLED, thereby to improve the brightness evenness of the OLED.

During the actual operation, prior to the touch sensing time period, the touch stage may further include a touch initialization time period. Within the touch initialization time period, the gate electrode of the driving transistor DTFT and the second end B of the storage capacitor C1 are both configured to receive the reference voltage Vref under the control of the threshold compensation control unit 15, and the first end A of the storage capacitor C1 is configured to receive a touch initialization voltage under the control of the touch detection unit 14. At this time, the OLED is in the reverse connection state, and thus it may not emit light. The touch initialization aims to prevent a subsequent operation from being adversely affected by a bias voltage at the storage capacitor C1 applied at the previous stage. Then, a suitable level is applied to the two ends of the storage capacitor C1 for the subsequent stage.

During the actual operation, after the touch detection time period and before the threshold compensation time period, the display stage further includes a display initialization time period. Within the display initialization time period, the gate electrode of the driving transistor DTFT is configured to receive the reference voltage Vref, and the second end B of the storage capacitor C1 is configured to receive the data voltage Vdata under the control of the threshold compensation control unit 15. The first electrode of the driving transistor DTFT is configured to receive a display initialization voltage from the touch detection line under the control of the touch detection unit 14, so as turn on the driving transistor DTFT. At this time, the OLED is in the reverse connection state, and thus it may not emit light. The gate electrode of the driving transistor DTFT is at the reference voltage Vref, and the first electrode of the driving transistor DTFT is at the display initialization voltage Vint from the touch detection line. For the gate-to-source voltage Vgs of the driving transistor DTFT, Vgs=Vref−Vint>Vth, where Vth is a threshold voltage of the driving transistor DTFT, so the DTFT is in the on state. However, because the OLED is in the reverse connection state (i.e., a high level is outputted from a second power line ELVss), the OLED may not emit light.

In the embodiments of the present disclosure, all the transistors are TFTs or field effect transistors (FETs) or any other elements having an identical characteristic. In order to differentiate the two electrodes, other than the gate electrode, from each other, one of the two electrodes is called as a source electrode, and the other is called as a drain electrode. In addition, depending on its characteristic, the transistor may be an n-type transistor or a p-type transistor.

For the driver circuit in the embodiments of the present disclosure, all the transistors are n-type transistors. Of course, the p-type transistors may also be used, which also fall within the scope of the present disclosure.

During the actual operation, the touch element may include a variable capacitor or a photosensitive diode.

To be specific, the touch element connection unit includes a first transistor, a gate electrode of which is configured to receive a first control signal, a first electrode of which is connected to the touch element, and a second electrode of which is connected to the second end of the storage capacitor.

To be specific, the driving control unit includes a second transistor, a gate electrode of which is configured to receive a second control signal, a first electrode of which is connected to the second end of the storage capacitor, and a second electrode of which is connected to the gate electrode of the driving transistor.

To be specific, the touch detection unit includes a third transistor, a gate electrode of which is configured to receive a third control signal, a first electrode of which is connected to the first end of the storage capacitor, and a second electrode of which is connected to the touch detection line.

To be specific, the first power voltage application unit includes a fourth transistor, a gate electrode of which is configured to receive a fourth control signal, a first electrode of which is connected to the second electrode of the driving transistor, and a second electrode of which is configured to receive a first power voltage.

To be specific, the threshold compensation control unit includes: a fifth transistor, a gate electrode of which is configured to receive a scanning voltage signal, a first electrode of which is connected to the gate electrode of the driving transistor, and a second electrode of which is configured to receive the reference voltage; and a sixth transistor, a gate electrode of which is configured to receive the scanning voltage signal, a first electrode of which is connected to the second end of the storage capacitor, and a second electrode of which is connected to a data line.

To be specific, the light-emitting element includes an OLED, an anode of which is connected to the first end of the storage capacitor, and an anode of which is connected to the second power line.

The pixel driver circuit will be described hereinafter in more details.

Figure 2:
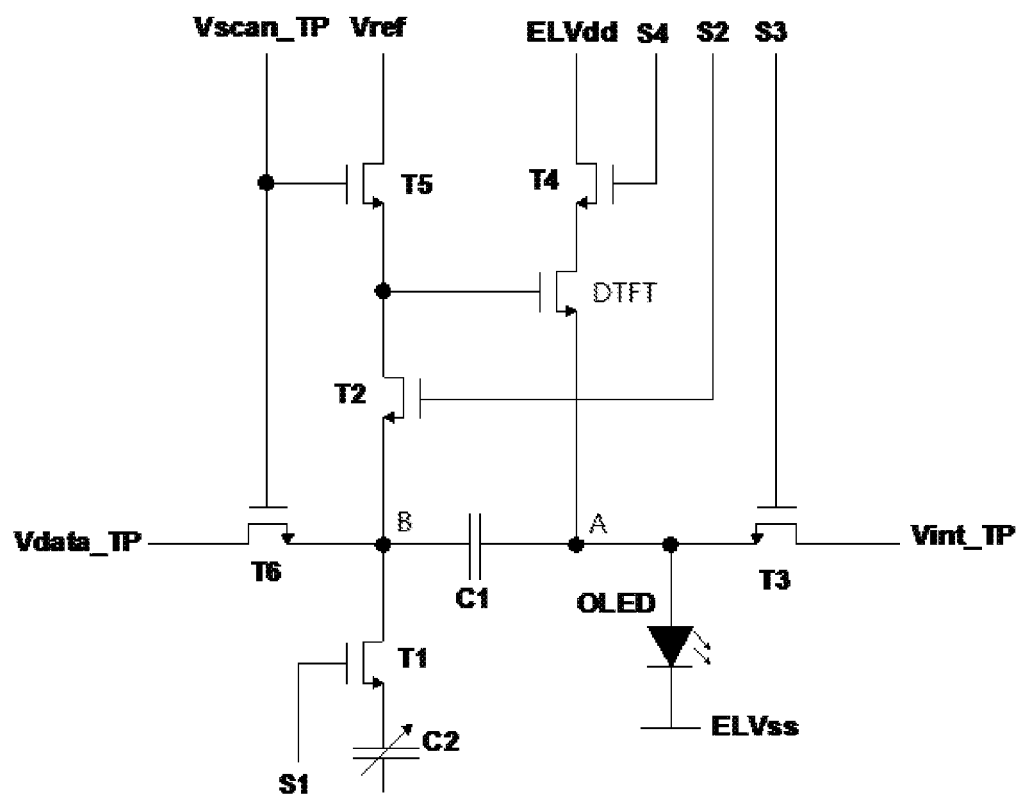
FIG. 2 is a circuit diagram of the pixel driver circuit according to one embodiment of the present disclosure.

As shown in FIG. 2, in an alternative embodiment of the present disclosure, the pixel driver circuit includes a driving transistor DTFT and a storage capacitor C1. A first electrode of the driving transistor DTFT is connected to an anode of an OLED, and the first end A of the storage capacitor C1 is connected to the first electrode of the driving transistor DTFT. A cathode of the OLED is connected to a second power line ELVss.

The pixel driver circuit further includes: a touch element connection unit connected between a variable capacitor C2 and a second end B of the storage capacitor C1; a diving control unit connected between a gate electrode of the driving transistor and the second end B of the storage capacitor C1; a first power voltage application unit connected between a second electrode of the driving transistor DTFT and a first power line ELVdd; a touch detection unit connected between a touch detection line Vint_TP and the first electrode of the driving transistor DTFT; and a threshold compensation control unit configured to receive a reference voltage Vref and connected to the gate electrode of the driving transistor DTFT and the second end of the storage capacitor C1.

The touch element connection unit includes a first transistor T1, a gate electrode of which is configured to receive a first control signal S1, a first electrode of which is connected to the variable capacitor C2, and a second electrode of which is connected to the second end B of the storage capacitor C1.

The driving control unit includes a second transistor T2, a gate electrode of which is configured to receive a second control signal S2, a first electrode of which is connected to the second end B of the storage capacitor C1, and a second electrode of which is connected to the gate electrode of the driving transistor DTFT.

The touch detection unit includes a third transistor T3, a gate electrode of which is configured to receive a third control signal S3, a first electrode of which is connected to the first end A of the storage capacitor C1, and a second electrode of which is connected to the touch detection line Vint_TP.

The first power voltage application unit includes a fourth transistor T4, a gate electrode of which is configured to receive a fourth control signal S4, a first electrode of which is connected to the second electrode of the driving transistor DTFT, and a second electrode of which is configured to receive a first power voltage ELVdd.

The threshold compensation control unit includes: a fifth transistor T5, a gate electrode of which is configured to receive a scanning voltage signal Vscan_TP, a first electrode of which is connected to the gate electrode of the driving transistor DTFT, and a second electrode of which is configured to receive the reference voltage Vref; and a sixth transistor T6, a gate electrode of which is configured to receive the scanning voltage signal Vscan_TP, a first electrode of which is connected to the second end B of the storage capacitor C1, and a second electrode of which is connected to a data line Vdata_TP.

Vdata_TP and Vscan_TP are input signal lines at both the touch stage and the display stage. Vint_TP is configured to input a signal within both the touch initialization time period and the touch sensing time period of the touch stage, it is a detection signal line connected to the touch element (i.e., the variable capacitor C2) within the touch detecting period of the touch stage, and it is used for the initialization at the display stage. Through the multiplexing of these signal lines, it is able to reduce the number of the input signal lines and simplify the circuit.

Figure 3:
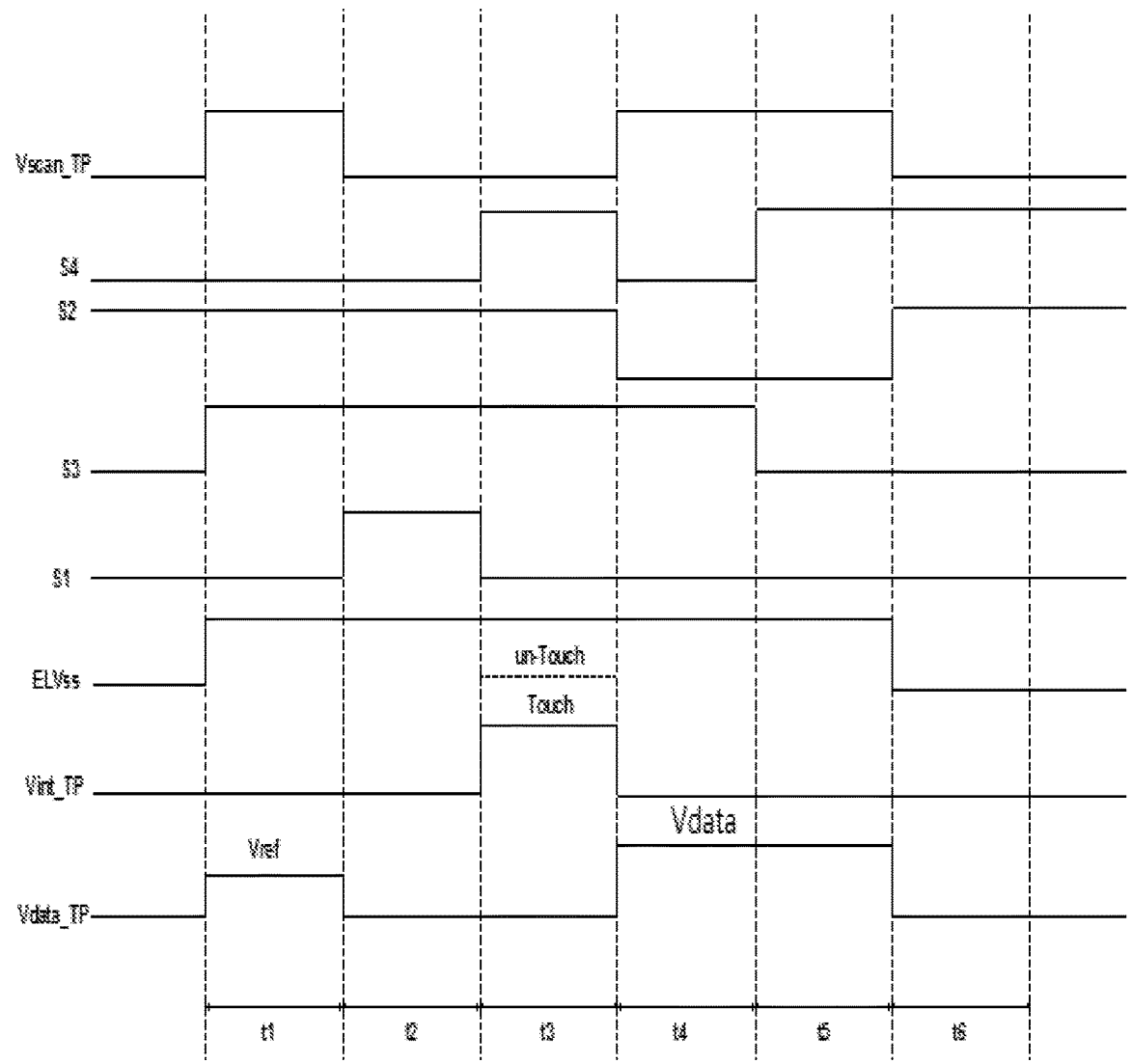
FIG. 3 is a sequence diagram of the pixel driver circuit according to one embodiment of the present disclosure.

As shown in FIG. 3, during the operation, an operation principle of the pixel driver circuit in FIG. 2 will be described hereinafter.

Within the touch initialization time period t1, Vscan_TP and S2 are both at a high level, and at this time, T5, T2 and T6 are in the on state, and Vref is written into the gate electrode of the DTFT. Because T6 is in the on state, Vref from Vdata_TP is written into the second end B of C1. Because S3 is at a high level, T3 is in the on state, and a signal from Vin_TP is written into the first end A of C1. In addition, because S4 is at a low level, ELVss outputs a high level. At this time, the OLED is in the reverse connection state, and thus it may not emit light. The touch initialization aims to prevent a subsequent operation from being adversely affected by a bias voltage previously applied to the DTFT, and then a suitable level is written into the two ends of the storage capacitor C1.

Within the touch sensing time period t2, Vscan_TP is at a low level, so T5 and T6 are in the off state. Because S3 is still maintained at a high level, T3 is still maintained in the on state, and the signal from Vint_TP is continuously written into the first end A of C1. Because S1 is at a high level, T1 is in the on state. At this time, in the case of a touch operation, a voltage at one end of the variable capacitor C2 may change, and the potential at the second end B of the storage capacitor C1 may change too. The gate electrode of the DTFT is connected to the second end B of C1, so in the case of the touch operation, the voltage at the gate electrode of the DTFT may change correspondingly. ELVss outputs a high level, so the OLED is in the reverse connection state, and it may not emit light.

Within the touch detection time period t3, S4 is at a high level, so T4 is in the on state, and the second electrode of the DTFT receives a high level from ELVdd. As mentioned within the time period t2, in the case of the touch operation, the voltage at the gate electrode of the DTFT may change, and the on-state current of the DTFT may change too. At this time, Vint_TP is a reception signal line. Hence, within a certain time period, it is able to determine whether or not the touch operation is made in accordance with a change in charges detected by Vint_TP. Because ELVss outputs a high level, the OLED is in the reverse connection state, and it may not emit light. An AMOLED display stage may follow the time period t3.

As shown in FIG. 3, within the time period t3, a potential detected by Vint_Tp and corresponding to a solid line Touch means that a touch operation is being made, and a potential detected by Vint_TP and corresponding to a dotted line Un-touch means that no touch operation is made.

Within the display initialization time period t4, Vscan_TP and S3 are both at a high level, so T5, T6 and T3 are in the on state. S2 and S4 are both at a low level, so T2 and T4 are in the off state. At this time, Vref is written into the gate electrode of the DTFT, and a data voltage Vdata from Vdata_TP is written into the second end B of the storage capacitor C1. In addition, the first end A of the storage capacitor C1 is configured to receive a signal Vint from Vint_TP, i.e., a voltage at the source electrode of the DTFT is Vint, and a gate-to-source voltage of the DTFT is Vref−Vint>Vth. At this time, the DTFT is in the on state. ELVss outputs a high level greater than Vint, so the OLED is in the reverse connection state, and it may not emit light.

Within the threshold compensation time period t5, Vscan_TP and S4 are both at a high level, and T5 and T6 are maintained in the on state, so Vref is continuously written into the gate electrode of the DTFT, and the second end B of C1 is still maintained at Vdata. S4 is at a high level, T4 is in the on state, and S3 is at a low level, so T3 is in the off state. As mentioned above, at this time, the DTFT is in the on state, to charge the first end A of C1 until the potential VA at the first end A is equal to Vref−Vth (Vth is a threshold voltage of the DTFT). At this time, a voltage across the two ends of C1 is Vdata−(Vref−Vth). As mentioned above, ELVss outputs a high level greater than Vref−Vth, so the OLED in the reverse connection state, and it may not emit light. It is found that, the threshold voltage compensation of the DTFT is irrelevant to the threshold voltage of the DTFT.

Within the display driving time period t6, Vscan_TP and S3 are at a low level, T5, T6 and T3 are in the off state, S2 is at a high level, and T2 is in the on state. At this time, the gate-to-source voltage Vgs of the DTFT is maintained at a value at the end of the time period t5, i.e., Vgs=Vdata−Vref+Vth. In addition, a value obtained by subtracting Vth from the gate-to-source voltage Vgs of the DTFT is less than the gate-to-drain voltage Vds of the DTFT, i.e., Vgs−Vth<Vds, so the DTFT is in a saturation state. At this time, for the on-state current I of the OLED, $I=K(Vgs-Vth)^2=K(Vdata-Vref+Vth-Vth)^2=K(Vdata-Vref)$, where K is a constant associated with a process parameter and a geometric dimension of the DTFT. It is found that, the on-state current of the OLED is indeed irrelevant to the threshold voltage of the DTFT. As a result, it is able to prevent the brightness of the OLED from being adversely affected by the threshold voltage of the DTFT, thereby to improve the brightness evenness of the OLED.

Within the subsequent time periods, each control signal has a value identical to that within the time period t6, so the OLED may emit light continuously, until Vscan_TP is at a high level again.

In FIG. 3, the following requirements need to be met. A high level from ELVss is greater than Vref+|Vth|, and except within the touch detection time period t3, Vref>Vint+Vth, where Vint is an initial voltage from Vint_TP, and Vth is a threshold voltage of the DTFT.

Figure 4:
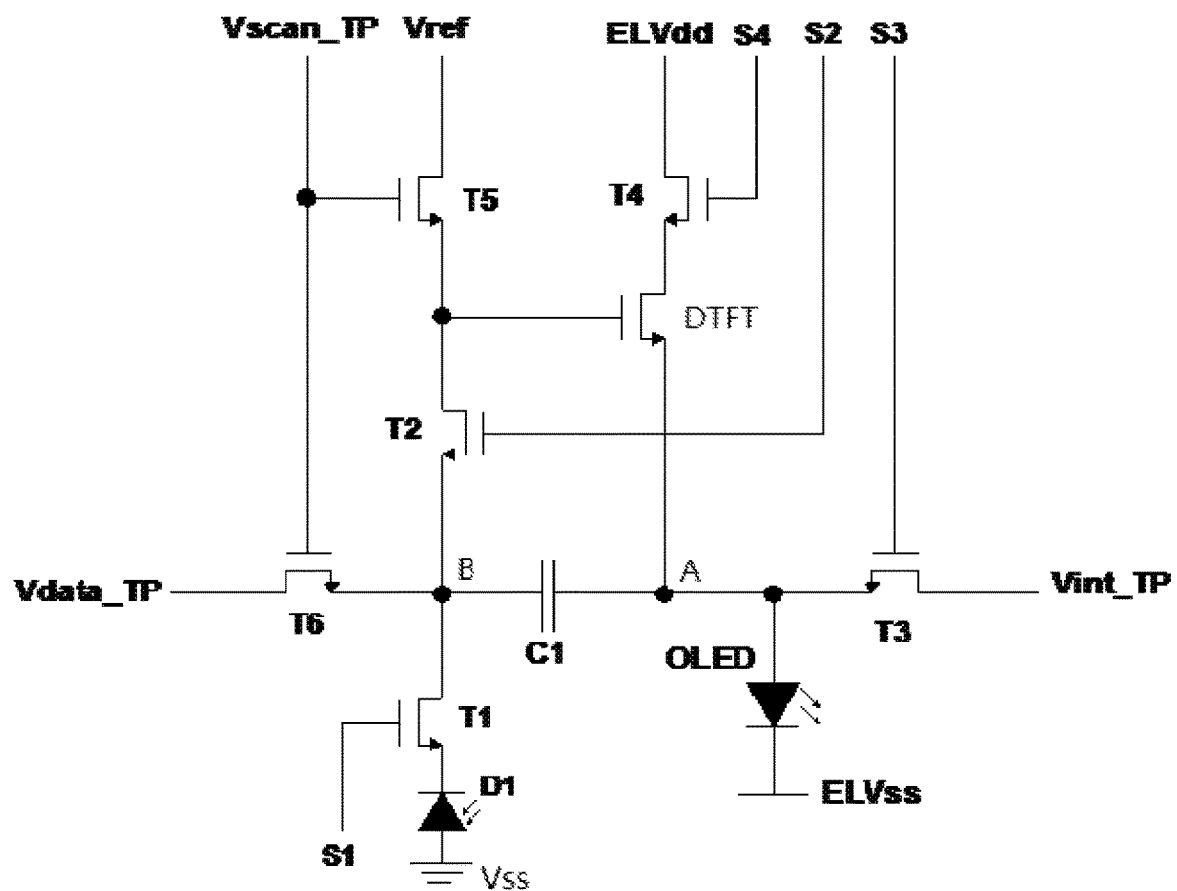
FIG. 4 is another circuit diagram of the pixel driver circuit according to one embodiment of the present disclosure.

FIG. 4 is another circuit diagram of the pixel driver circuit according to one embodiment of the present disclosure, and it differs from FIG. 2 merely in that the touch element is a photosensitive diode D1, a cathode of which is connected to T1, and an anode of which is configured to receive the second power voltage Vss.

According to the pixel driver circuit in the embodiments of the present disclosure, it is able to achieve the touch function and the threshold voltage compensation function, regardless of the threshold voltage of the driving transistor, thereby to improve the display function and the display effect.

The present disclosure further provides in some embodiments a pixel driving method using the above-mentioned pixel driver circuit. The pixel driving method includes: a touch sensing step of, within a touch sensing time period of a touch stage, enabling the second end of the storage capacitor to receive a touch sensing voltage from the touch element under the control of the touch element connection unit, and enabling the driving control unit to write the touch sensing voltage into the gate electrode of the driving transistor; a touch detecting step of, within a touch detecting time period of the touch stage, enabling the second electrode of the driving transistor to receive a first power voltage under the control of the first power voltage application unit, and enabling the first electrode of the driving transistor to be electrically connected to the touch detection line under the control of the touch detection unit, to enable the driving transistor to output a corresponding touch sensing current to the touch detection line in accordance with the touch sensing voltage written into the gate electrode of the driving transistor; a threshold compensation step of, within a threshold compensation time period of a display stage, enabling the gate electrode of the driving transistor to receive a reference voltage Vref and enabling the second end of the storage capacitor to receive a data voltage Vdata under the control of the threshold compensation control unit, and enabling the second electrode of the driving transistor to receive the first power voltage under the control of the first power voltage application unit, to enable the driving transistor to be in an on state, thereby to charge the storage capacitor until the first end of the storage capacitor is at a potential of Vref−Vth, Vth being a threshold voltage of the driving transistor; and a display driving step of, within a display driving time period of the display stage, enabling the gate electrode of the driving transistor to be electrically connected to the second end of the storage capacitor under the control of the driving control unit, and enabling the second electrode of the driving transistor to receive the first power voltage under the control of the first power voltage application unit, to enable the driving transistor to be in the on state, thereby to drive the light-emitting element to emit light.

To be specific, subsequent to the touch detection step and prior to the threshold compensation step, the method further includes a display initialization step of, within a display initialization time period, enabling the gate electrode of the driving transistor to receive the reference voltage and enabling the second end of the storage capacitor to receive the data voltage under the control of the threshold compensation control unit, and enabling the first electrode of the driving transistor to receive a display initialization voltage from the touch detection line under the touch control of the touch detection unit, to enable the driving transistor to be in the on state.

To be specific, prior to the touch sensing step, the method further includes a touch initialization step of, within a touch initialization time period, enabling the gate electrode of the driving transistor and the second end of the storage capacitor to receive the reference voltage under the control of the threshold compensation control unit, and enabling the first end of the storage capacitor to receive a touch initialization voltage from the touch detection line under the control of the touch detection unit.

The present disclosure further provides in some embodiments a pixel driving method using the above-mentioned pixel driver circuit. The pixel driving method includes: a touch sensing step of, within a touch sensing time period of a touch stage, enabling the first transistor to be in an on state to enable the second end of the storage capacitor to receive a touch sensing voltage from the touch element, enabling the second transistor to be in the on state to write the touch sensing voltage into the gate electrode of the driving transistor, and enabling the light-emitting element to be in a reverse connection state through controlling a value of a second power voltage, to enable the light-emitting element not to emit light; a touch detection step of, within a touch detection time period of the touch stage, enabling the first transistor to be in an off state, maintaining the second transistor to be in the on state, enabling the third transistor to be in the on state, enabling the fourth transistor to be in the on state, enabling the second electrode of the driving transistor to receive the first power voltage and enabling the first electrode of the driving transistor to be electrically connected to the touch detection line to enable the driving transistor to be in the on stat and output a sensing current corresponding to the touch sensing voltage to the touch detection line, and enabling the light-emitting element to be in a reverse connection state through controlling the value of the second power voltage, to enable the light-emitting element not to emit light; a threshold compensation step of, within a threshold compensation time period of a display stage, maintaining the fourth transistor to be in the on state, enabling the fifth transistor and the sixth transistor to be in the on state, to enable the gate electrode of the driving transistor to receive a reference voltage Vref, enable the second electrode of the driving transistor to receive the first power voltage and enable the second end of the storage capacitor to receive a data voltage Vdata, thereby to enable the driving transistor to be in the on state and charge the storage capacitor until the first electrode of the driving transistor is at a potential of Vref−Vth, and enabling the light-emitting element to be in the reverse connection state through controlling the value of the second power voltage, to enable the light-emitting element not to emit light, Vth being a threshold voltage of the driving transistor; and a display driving step of, within a display driving time period of the display stage, maintaining the fourth transistor to be in the on state, enabling the second transistor to be in the on state, to enable the gate electrode of the driving transistor to be electrically connected to the second end of the storage capacitor and enable the first electrode of the driving transistor to be electrically connected to the light-emitting element, thereby to enable the second electrode of the driving transistor to receive the first power voltage and enable the driving transistor to be in the on state, and enabling the light-emitting element to be in a normal connection state through controlling the value of the second power voltage, to enable the driving transistor to drive the light-emitting element to emit light.

Optionally, subsequent to the touch detection step and the prior to the threshold compensation step, the method further includes a display initialization step of, within a display initialization time period, enabling the third transistor, the fifth transistor and the sixth transistor to be in the on state, to enable the gate electrode of the driving transistor to receive the reference voltage, enable the first electrode of the driving transistor to receive a display initialization voltage, and enable the second end of the storage capacitor to receive the data voltage, thereby to enable the driving transistor to be in the on state.

Optionally, prior to the touch sensing step, the method further includes a touch initialization step of, within a touch initialization time period, enabling the second transistor, the third transistor, the fifth transistor and the sixth transistor to be in the on state, and enabling a data line to receive the reference voltage, to enable the gate electrode of the driving transistor and the second end of the storage capacitor to receive the reference voltage, and enable the first end of the storage capacitor to receive a touch initialization voltage from the touch detection line.

The present disclosure further provides in some embodiments a pixel circuit including a light-emitting element, a touch element and the above-mentioned pixel driver circuit. The pixel driver circuit is configured to sense whether or not the touch element is being touched and drive the light-emitting element to emit light.

To be specific, the light-emitting element includes an OLED, an anode of which is connected to the pixel driver circuit, and an anode of which is configured to receive a second power voltage.

To be specific, the touch element includes a variable capacitor or a photosensitive diode.

The present disclosure further provides in some embodiments a display device including the above-mentioned pixel circuit. The display device may be any product or member having display and touch functions, such as a display panel (e.g., a liquid crystal panel or an OLED display panel), an electronic paper, a liquid crystal television, a liquid crystal display, a digital photo frame, a mobile phone or a flat-panel computer.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A pixel driver circuit, comprising a driving transistor and a storage capacitor, wherein
a first electrode of the driving transistor is connected to a light-emitting element, and a first end of the storage capacitor is connected to the first electrode of the driving transistor, and
the pixel driver circuit further comprises:
a touch element connection unit connected between a touch element and a second end of the storage capacitor;
a diving control unit connected between a gate electrode of the driving transistor and the second end of the storage capacitor;
a first power voltage application unit connected between a second electrode of the driving transistor and a first power line;
a touch detection unit connected between a touch detection line and the first electrode of the driving transistor; and
a threshold compensation control unit configured to receive a reference voltage and connected to the gate electrode of the driving transistor and the second end of the storage capacitor,
wherein the driving control unit comprises a second transistor, a gate electrode of which is configured to receive a second control signal, a first electrode of which is connected to the second end of the storage capacitor, and a second electrode of which is connected to the gate electrode of the driving transistor.

2. The pixel driver circuit according to claim 1, wherein the touch element connection unit comprises a first transistor, a gate electrode of which is configured to receive a first control signal, a first electrode of which is connected to the touch element, and a second electrode of which is connected to the second end of the storage capacitor.

3. The pixel driver circuit according to claim 1, wherein the touch detection unit comprises a third transistor, a gate electrode of which is configured to receive a third control signal, a first electrode of which is connected to the first end of the storage capacitor, and a second electrode of which is connected to the touch detection line.

4. The pixel driver circuit according to claim 1, wherein the first power voltage application unit comprises a fourth transistor, a gate electrode of which is configured to receive a fourth control signal, a first electrode of which is connected to the second electrode of the driving transistor, and a second electrode of which is configured to receive a first power voltage.

5. The pixel driver circuit according to claim 1, wherein the threshold compensation control unit comprises: a fifth transistor, a gate electrode of which is configured to receive a scanning voltage signal, a first electrode of which is connected to the gate electrode of the driving transistor, and a second electrode of which is configured to receive the reference voltage; and a sixth transistor, a gate electrode of which is configured to receive the scanning voltage signal, a first electrode of which is connected to the second end of the storage capacitor, and a second electrode of which is connected to a data line.

6. A pixel driving method using a pixel driver circuit comprising a driving transistor and a storage capacitor, wherein a first electrode of the driving transistor is connected to a light-emitting element, and a first end of the storage capacitor is connected to the first electrode of the driving transistor, and the pixel driver circuit further comprises: a touch element connection unit connected between a touch element and a second end of the storage capacitor; a diving control unit connected between a gate electrode of the driving transistor and the second end of the storage capacitor; a first power voltage application unit connected between a second electrode of the driving transistor and a first power line; a touch detection unit connected between a touch detection line and the first electrode of the driving transistor; and a threshold compensation control unit configured to receive a reference voltage and connected to the gate electrode of the driving transistor and the second end of the storage capacitor, the method comprising:

a touch sensing step of, within a touch sensing time period of a touch stage, enabling the second end of the storage capacitor to receive a touch sensing voltage from the touch element under the control of the touch element connection unit, and enabling the driving control unit to write the touch sensing voltage into the gate electrode of the driving transistor;

a touch detecting step of, within a touch detecting time period of the touch stage, enabling the second electrode of the driving transistor to receive a first power voltage under the control of the first power voltage application unit, and enabling the first electrode of the driving transistor to be electrically connected to the touch detection line under the control of the touch detection unit, to enable the driving transistor to output a corresponding touch sensing current to the touch detection line in accordance with the touch sensing voltage written into the gate electrode of the driving transistor;

a threshold compensation step of, within a threshold compensation time period of a display stage, enabling the gate electrode of the driving transistor to receive a reference voltage Vref and enabling the second end of the storage capacitor to receive a data voltage Vdata under the control of the threshold compensation control unit, and enabling the second electrode of the driving transistor to receive the first power voltage under the control of the first power voltage application unit, to enable the driving transistor to be in an on state, thereby to charge the storage capacitor until the first end of the storage capacitor is at a potential of Vref−Vth, Vth being a threshold voltage of the driving transistor; and a display driving step of, within a display driving time period of the display stage, enabling the gate electrode of the driving transistor to be electrically connected to the second end of the storage capacitor under the control of the driving control unit, and enabling the second electrode of the driving transistor to receive the first power voltage under the control of the first power voltage application unit, to enable the driving transistor to be in the on state, thereby to drive the light-emitting element to emit light.

7. The pixel driving method according to claim 6, wherein subsequent to the touch detection step and prior to the threshold compensation step, the pixel driving method further comprises a display initialization step of, within a display initialization time period, enabling the gate electrode of the driving transistor to receive the reference voltage and enabling the second end of the storage capacitor to receive the data voltage under the control of the threshold compensation control unit, and enabling the first electrode of the driving transistor to receive a display initialization voltage from the touch detection line under the touch control of the touch detection unit, to enable the driving transistor to be in the on state.

8. The pixel driving method according to claim 6, wherein prior to the touch sensing step, the pixel driving method further comprises a touch initialization step of, within a touch initialization time period, enabling the gate electrode of the driving transistor and the second end of the storage capacitor to receive the reference voltage under the control of the threshold compensation control unit, and enabling the first end of the storage capacitor to receive a touch initialization voltage from the touch detection line under the control of the touch detection unit.

9. A pixel driving method using a pixel driver circuit comprising a driving transistor and a storage capacitor, wherein a first electrode of the driving transistor is connected to a light-emitting element, and a first end of the storage capacitor is connected to the first electrode of the driving transistor, and the pixel driver circuit further comprises: a touch element connection unit connected between a touch element and a second end of the storage capacitor; a diving control unit connected between a gate electrode of the driving transistor and the second end of the storage capacitor; a first power voltage application unit connected between a second electrode of the driving transistor and a first power line; a touch detection unit connected between a touch detection line and the first electrode of the driving transistor; and a threshold compensation control unit configured to receive a reference voltage and connected to the gate electrode of the driving transistor and the second end of the storage capacitor, wherein the touch element connection unit comprises a first transistor, a gate electrode of which is configured to receive a first control signal, a first electrode of which is connected to the touch element, and a second electrode of which is connected to the second end of the storage capacitor;

the driving control unit comprises a second transistor, a gate electrode of which is configured to receive a second control signal, a first electrode of which is connected to the second end of the storage capacitor, and a second electrode of which is connected to the gate electrode of the driving transistor;

the touch detection unit comprises a third transistor, a gate electrode of which is configured to receive a third control signal, a first electrode of which is connected to the first end of the storage capacitor, and a second electrode of which is connected to the touch detection line;

the first power voltage application unit comprises a fourth transistor, a gate electrode of which is configured to receive a fourth control signal, a first electrode of which is connected to the second electrode of the driving transistor, and a second electrode of which is configured to receive a first power voltage;

the threshold compensation control unit comprises: a fifth transistor, a gate electrode of which is configured to receive a scanning voltage signal, a first electrode of which is connected to the gate electrode of the driving transistor, and a second electrode of which is configured to receive the reference voltage; and a sixth transistor, a gate electrode of which is configured to receive the scanning voltage signal, a first electrode of which is connected to the second end of the storage capacitor, and a second electrode of which is connected to a data line;

the pixel driving method comprises:

a touch sensing step of, within a touch sensing time period of a touch stage, enabling the first transistor to be in an on state to enable the second end of the storage capacitor to receive a touch sensing voltage from the touch element, enabling the second transistor to be in the on state to write the touch sensing voltage into the gate electrode of the driving transistor, and enabling the light-emitting element to be in a reverse connection state through controlling a value of a second power voltage, to enable the light-emitting element not to emit light;

a touch detection step of, within a touch detection time period of the touch stage, enabling the first transistor to be in an off state, maintaining the second transistor to be in the on state, enabling the third transistor to be in the on state, enabling the fourth transistor to be in the on state, enabling the second electrode of the driving transistor to receive the first power voltage and enabling the first electrode of the driving transistor to be electrically connected to the touch detection line to enable the driving transistor to be in the on state and output a sensing current corresponding to the touch sensing voltage to the touch detection line, and enabling the light-emitting element to be in a reverse connection state through controlling the value of the second power voltage, to enable the light-emitting element not to emit light;

a threshold compensation step of, within a threshold compensation time period of a display stage, maintaining the fourth transistor to be in the on state, enabling the fifth transistor and the sixth transistor to be in the on state, to enable the gate electrode of the driving transistor to receive a reference voltage Vref, enable the second electrode of the driving transistor to receive the first power voltage and enable the second end of the storage capacitor to receive a data voltage Vdata, thereby to enable the driving transistor to be in the on state and charge the storage capacitor until the first electrode of the driving transistor is at a potential of Vref−Vth, and enabling the light-emitting element to be in the reverse connection state through controlling the value of the second power voltage, to enable the light-emitting element not to emit light, Vth being a threshold voltage of the driving transistor; and a display driving step of, within a display driving time period of the display stage, maintaining the fourth transistor to be in the on state, enabling the second transistor to be in the on state, to enable the gate electrode of the driving transistor to be electrically connected to the second end of the storage capacitor and enable the first electrode of the driving transistor to be electrically connected to the light-emitting element, thereby to enable the second electrode of the driving transistor to receive the first power voltage and enable the driving transistor to be in the on state, and enabling the light-emitting element to be in a normal connection state through controlling the value of the second power voltage, to enable the driving transistor to drive the light-emitting element to emit light.

10. The pixel driving method according to claim 9, wherein subsequent to the touch detection step and the prior to the threshold compensation step, the pixel driving method further comprises a display initialization step of, within a display initialization time period, enabling the third transistor, the fifth transistor and the sixth transistor to be in the on state, to enable the gate electrode of the driving transistor to receive the reference voltage, enable the first electrode of the driving transistor to receive a display initialization voltage, and enable the second end of the storage capacitor to receive the data voltage, thereby to enable the driving transistor to be in the on state.

11. The pixel driving method according to claim 9, wherein prior to the touch sensing step, the pixel driving method further comprises a touch initialization step of, within a touch initialization time period, enabling the second transistor, the third transistor, the fifth transistor and the sixth transistor to be in the on state, and enabling the data line to receive the reference voltage, to enable the gate electrode of the driving transistor and the second end of the storage capacitor to receive the reference voltage, and enable the first end of the storage capacitor to receive a touch initialization voltage from the touch detection line.

12. A pixel circuit, comprising a light-emitting element, a touch element and the pixel driver circuit according to claim 1, wherein the pixel driver circuit is configured to sense whether or not the touch element is being touched and drive the light-emitting element to emit light.

13. The pixel circuit according to claim 12, wherein the light-emitting element comprises an organic light-emitting diode (OLED), an anode of which is connected to the pixel driver circuit, and an anode of which is configured to receive a second power voltage.

14. The pixel circuit according to claim 12, wherein the touch element comprises a variable capacitor or a photosensitive diode.

15. The pixel circuit according to claim 12, wherein the touch element connection unit comprises a first transistor, a gate electrode of which is configured to receive a first control signal, a first electrode of which is connected to the touch element, and a second electrode of which is connected to the second end of the storage capacitor.

16. The pixel circuit according to claim 12, wherein the touch detection unit comprises a third transistor, a gate electrode of which is configured to receive a third control signal, a first electrode of which is connected to the first end of the storage capacitor, and a second electrode of which is connected to the touch detection line.

17. The pixel circuit according to claim 12, wherein the first power voltage application unit comprises a fourth transistor, a gate electrode of which is configured to receive a fourth control signal, a first electrode of which is connected to the second electrode of the driving transistor, and a second electrode of which is configured to receive a first power voltage.

18. A display device, comprising the pixel circuit according to claim 13.

* * * * *